United States Patent [19]

Goatman

[11] Patent Number: 4,773,090
[45] Date of Patent: Sep. 20, 1988

[54] SUB-ASSEMBLY FOR ELECTRICAL APPARATUS AND ELECTRICAL APPARATUS INCLUDING SUCH A SUB-ASSEMBLY

[75] Inventor: Michael C. Goatman, Tetbury, Great Britain

[73] Assignee: U.S. Philips Corp., New York, N.Y.

[21] Appl. No.: 916,918

[22] Filed: Oct. 9, 1986

[30] Foreign Application Priority Data

Oct. 9, 1985 [GB] United Kingdom ............... 8524843

[51] Int. Cl.[4] ............................................. H04M 1/02
[52] U.S. Cl. .................................... 379/429; 200/5 A; 340/365 VL; 379/428; 379/369
[58] Field of Search ..................... 200/5 A, 43.18, 307, 200/295, 296; 340/815.1, 815.14, 815.2, 365 VL; 235/145 R, 145 A; 379/429, 428, 433, 434–436, 440, 368, 369

[56] References Cited

U.S. PATENT DOCUMENTS

| | | | |
|---|---|---|---|
| D. 282,740 | 2/1986 | Rood | 379/434 |
| 3,521,008 | 7/1970 | Tyson | 379/434 |
| 4,072,840 | 2/1978 | Daigle | 200/296 |
| 4,092,527 | 5/1978 | Luecke | 340/365 VL |
| 4,284,855 | 8/1981 | Adams et al. | 379/435 |
| 4,363,942 | 12/1982 | Deeg et al. | 200/5 A |
| 4,375,584 | 3/1983 | Muzumdar et al. | 379/428 |
| 4,385,212 | 5/1983 | Tyler | 379/440 |
| 4,481,587 | 11/1984 | Daniels, Jr. | 340/365 VL |
| 4,581,495 | 4/1986 | Geri et al. | 379/419 X |

OTHER PUBLICATIONS

Jansen, "KT20 Multi-Function Telephone Terminals", Philips Telecommunication Review, vol. 40, No. 4, Dec. 1982, pp. 327–336.

Hansbauer et al., "Modular Telephone User Equipment Line", Telefon Report 9, Mar. 1973, pp. 73–83.

*Primary Examiner*—Jin F. Ng
*Assistant Examiner*—M. Connors
*Attorney, Agent, or Firm*—Thomas A. Briody; Jack Oisher

[57] ABSTRACT

A sub-assembly (20) of a housing for electronic equipment and which is capable of carrying electronic components. The sub-assembly (20) comprises an injection moulded plastics body having an area (21) in which a regular array of apertures (22) are formed, pushbuttons (23) being mounted in each aperture of the regular array of apertures. The pushbuttons (23) are shaped and dimensioned so that they cover the whole of the first area (21), the gaps between the pushbuttons (23) being limited to those required to allow clearance for operation of individual pushbuttons (23). Some of the pushbuttons are replaced by cover plates (24,25) which are mounted in appropriate apertures of the array of apertures.

The pushbuttons (23) operate on dome shape elastomeric switching elements (45) arranged between the pushbutton plungers (43) and the printed circuit board (40). The domes have an electrically conductive portion which bridges conductive tracks on the printed circuit board when the corresponding pushbutton is depressed.

The sub-assembly (20) further comprises a second area (31) in which a single aperture (32) is provided which covers a major portion of the second area (31).

12 Claims, 6 Drawing Sheets

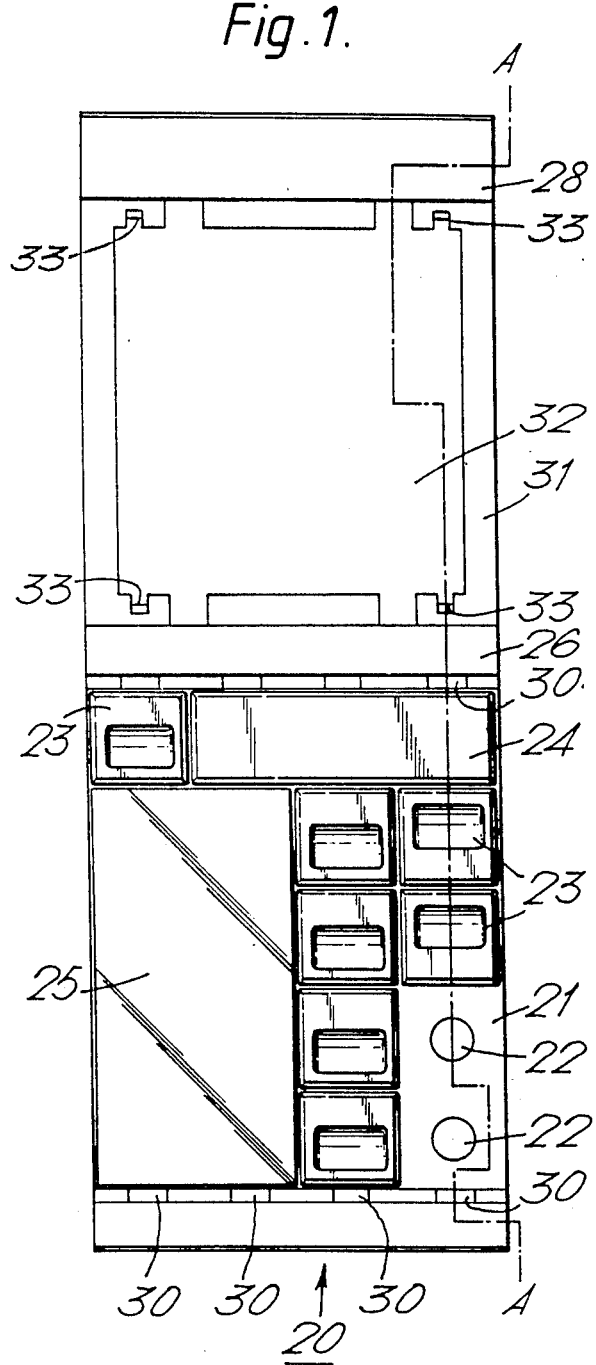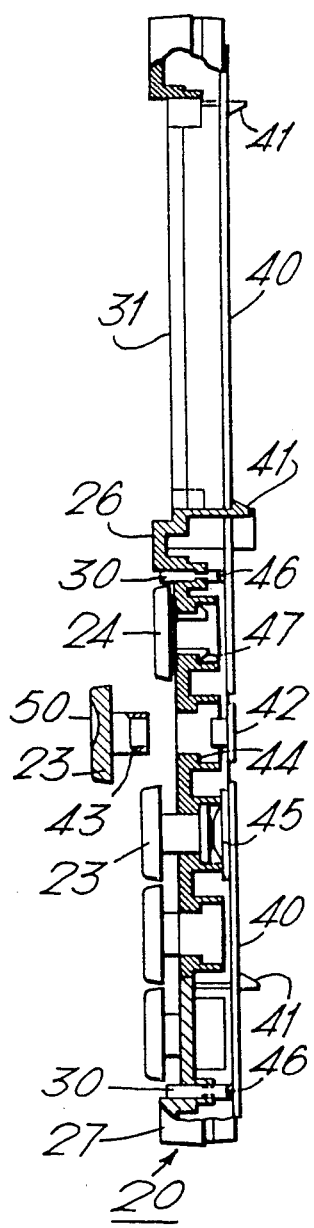

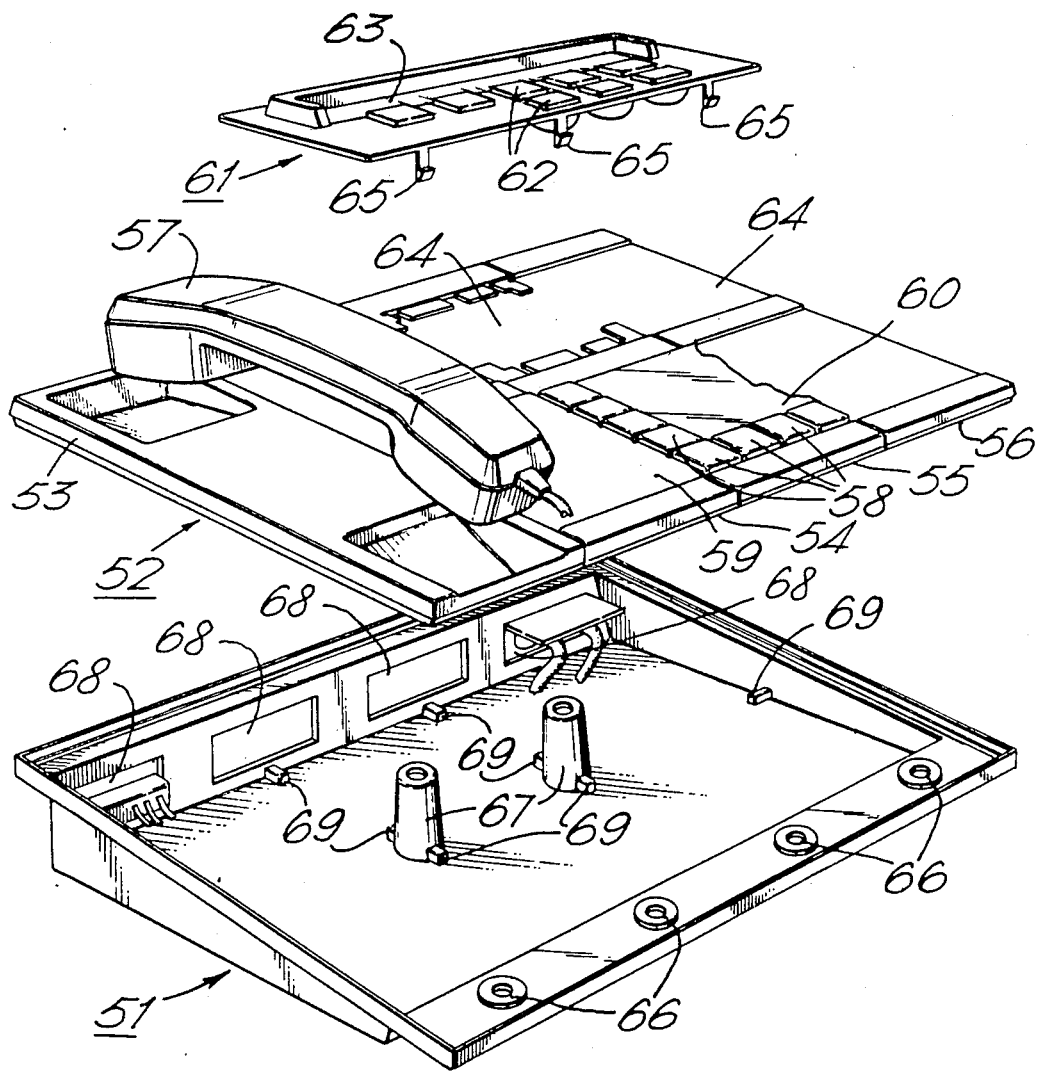

SUB-ASSEMBLY FOR ELECTRICAL APPARATUS AND ELECTRICAL APPARATUS INCLUDING SUCH A SUB-ASSEMBLY

BACKGROUND OF THE INVENTION

1. Field of the Invention

The invention relates to a sub-assembly of a housing for electronic equipment and which is capable of carrying electronic components, the sub-assembly comprising an injection moulded plastics body having a first surface constructed to form part of the exterior surface of the housing.

2. Description of the Related Art

Various types of electrical apparatus are constructed in modular form to allow a number of facilities appropriate to a given application to be provided in an economical manner. Apparatus such as data terminals or telephone instruments may be provided in basic form or with a number of different options. While these various options may be provided by adding standard modules to the basic apparatus this still leaves the problem of the physical construction of the apparatus, i.e. how to allow for the varying quantity of equipment to be housed. This can be achieved by having a custom designed housing for each variant but since the housings are frequently formed from injection moulded plastics sections the tooling costs become high, especially since an increasing number of offered options means that the quantity of any one version is reduced. A telephone instrument housing comprising a sub-assembly as described herein is disclosed in applicant's copending applications Ser. Nos. 916,919 and 916,922, filed concurrently herewith.

German Pat. No. 1223889 shows a telephone instrument which comprises a number of modules which are inserted in a base section, the upper surfaces of the modules providing the upper surface of the housing. The modules comprise inter alia handset modules, dial modules, switch modules, lamp modules. These modules are however of different shapes and sizes which increases their cost of production.

SUMMARY OF THE INVENTION

It is an object of the invention to enable the production of a sub-assembly which can be used to form part of the housing for electrical apparatus and which uses a single moulding which enables various electrical functions to be incorporated.

The invention provides a sub-assembly as set forth in the opening paragraph characterised in that the sub-assembly has a second, interior, surface which is provided with projections for mounting a printed circuit board and comprises an area in which a regular array of apertures are formed, pushbuttons being mounted in each aperture of the regular array of apertures, the buttons being shaped and dimensioned so that they cover the whole of the first area, the gaps between the buttons being limited to those required to allow clearance for operation of individual buttons.

The regular array of apertures allows the mounting of pushbuttons in any selected position in the first area. Any positions in which pushbuttons are not required can be covered by blank plates which can be located in the corresponding apertures.

One or more pushbuttons may be replaced by one or more cover plates which are mounted in appropriate apertures of the array of apertures. When a single pushbutton is replaced, the cover plate may comprise a dummy pushbutton.

The pushbuttons may operate on dome shaped elastomeric switching elements arranged between the pushbutton plungers and the printed circuit board, the domes having an electrically conductive portion which bridges conductive tracks on the printed circuit board when the corresponding pushbutton is depressed.

The area may further comprise a further series of apertures for locating indicating devices. The indicating devices may comprise a light source mounted on the printed circuit board and a light guide located in a corresponding further aperture to be visible from the first surface.

The sub-assembly may further comprise a second area in which a single aperture is formed, the single aperture extending over a major portion of the second area.

The sub-assembly may be rectangular in plan and may be divided by a third area in the form of a ridge which extends perpendicular to the longer sides of the rectangle across the full width of the rectangle.

The sub-assembly may further comprise fourth and fifth areas, each of which is in the form of a ridge extending perpendicular to the longer sides of the rectangle across the full width of the rectangle, the fourth and fifth areas forming respective ends of the rectangle. The fourth and fifth areas may comprise means for locating the printed circuit board. The third area may comprise means for locating the printed circuit board. The fourth and fifth areas may comprise or carry means for connecting the sub-assembly to a further assembly to form a housing for electrical apparatus.

The invention further provides a telephone instrument comprising such a sub-assembly and a base section to which the sub-assembly is connected.

In such a telephone instrument the first area may locate digit pushbuttons and a further sub-assembly which includes a display device may be located in the aperture of the second area.

BRIEF DESCRIPTION OF THE DRAWINGS

Embodiments of the invention will now be described, by way of example, with reference to the accompanying drawings, in which:

FIG. 1 shows a plan view of an embodiment of a sub-assembly according to the invention, FIG. 2 is a cross-sectional elevation of the sub-assembly shown in FIG. 1, the section being taken on line A—A, FIG. 3 is an exploded, perspective view of a telephone instrument which has a housing including a sub-assembly according to the invention.

DESCRIPTION OF THE PREFERRED EMBODIMENTS

Figure 4:
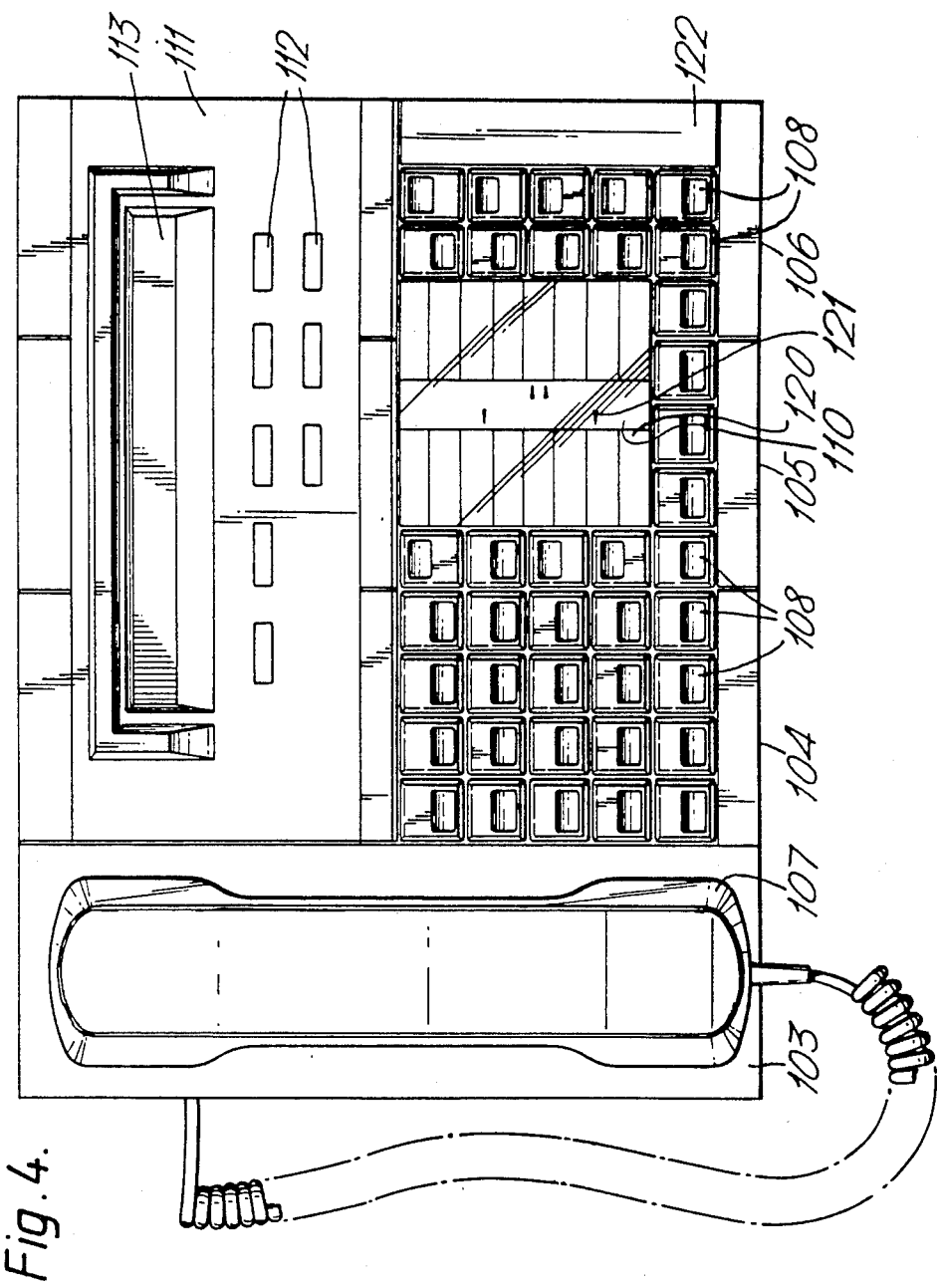
FIG. 4 is a plan view of an embodiment of a telephone instrument similar to that shown in FIG. 3.

FIG. 1 shows a plan view of an embodiment of a sub-section according to the invention. The sub-section comprises a first part 21 defining a matrix of apertures 22 for locating an array of pushbuttons 23. In this instance the matrix of apertures 22 comprises four columns and five rows. These numbers are arbitary and may be changed depending on the application. In the embodiment shown in FIG. 1 the pushbuttons 23 are arranged to have a minimum spacing so that there is merely sufficient clearance between them to allow independent operation. When pushbuttons are not required in every position in the matrix of apertures cover plates 24, 25 are fitted to mask those apertures 22 where a pushbutton is not required and provide a finished surface to the top of the telephone instrument. The pushbuttons and cover plates may be blank or may carry legends which may be produced in any convenient fashion, for example printing or engraving.

The first part 21 and a second part 31 are separated by a ridge 26 and two further ridges 27 and 28 are formed at each end of the sub-section and define the extents of the first part 21 and second part 31. The first part 21 is also provided with a number of display devices 30 which are located next to pushbutton positions adjacent to the ridges 26 and 27.

The second part 31 of the sub-section 20 defines an aperture 32 which extends over a major portion of the second part 31. The aperture 32 is provided with four projections 33 for co-operation with spring barbs to locate a cover plate or additional sub-assembly in the aperture 32. The aperture 32 extends over the major portion of the second part to allow access to the underside of a sub-assembly, when provided, to enable electrical connection between the sub-assembly and a printed circuit board to be made without inconvenience.

FIG. 2 is a cross-sectional view of the sub-section on line A—A of FIG. 1. The sub-section 20 is mounted on a printed circuit board 40 by means of barbs 41 which project through co-operating apertures (not shown) in the printed circuit board 40. The pushbutton tops 23 are located in the apertures 22 by means of plugs 42 which are a friction fit within the hollow stem 43 of the pushbutton tops 23 and which engage against shoulders 44 of the apertures 22 to prevent the pushbutton tops 23 being displaced from the apertures. The printed circuit board 40 is shown broken in the region of the plug 42 merely to enable the fitting of the pushbuttons to be clearly indicated and in practice the printed circuit board extends continuously. The plug 42 is biassed against the shoulder 44 by means of an elastomeric dome 45 which includes a conductive pill which short circuits tracks on the printed circuit board when the pushbutton is depressed. Only one dome is shown for reasons of clarity but all operative pushbuttons are provided with such domes. The cover plate 24 is located by means of barbs 47 which engage behind the shoulders 44 of appropriate apertures 22. The cover plate 25 is, of course, located in the same manner. The pushbutton tops are square and have a flat surface which contains a depression 50 which extends over substantially half the top surface area. As can be seen from FIG. 4 the pushbutton tops 23 can be mounted with the depression in different orientations the purpose of which will be described hereinafter.

The display devices 30 comprise a surface mounted light emitting diode 46 and a light guide 30, for example a perspex rod, which is in contact with the light emitting surface of the diode 46 at one end and whose other end provides the visual display at the top surface of the apparatus.

Figure 7:
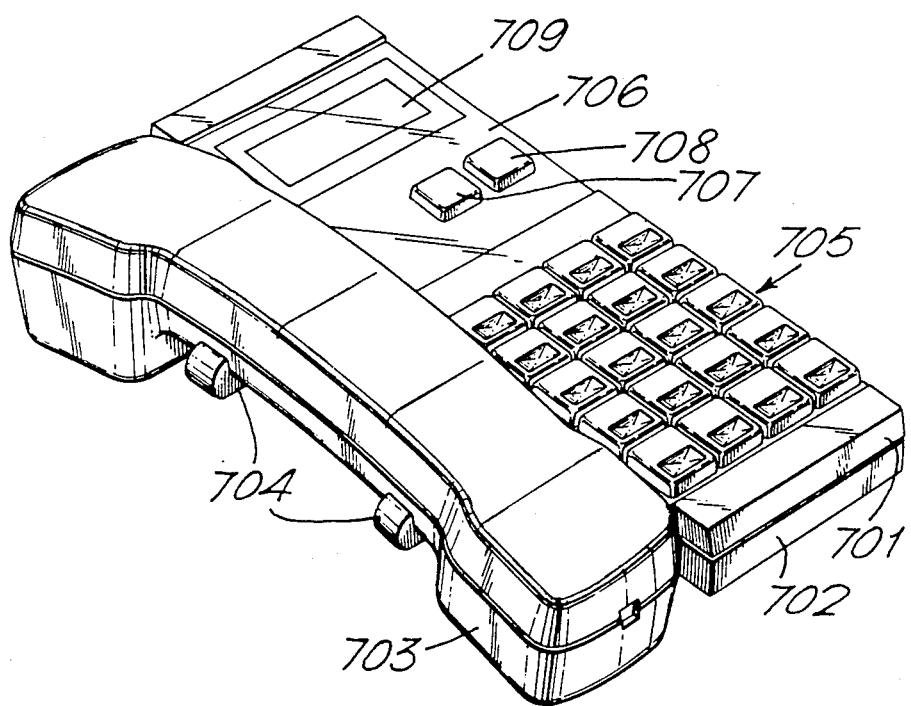
FIG. 7 is a plan view of a further telephone instrument according to the invention.

FIG. 3 shows an exploded perspective view of a telephone instrument as an illustration of electrical apparatus using the sub-section of FIGS. 1 and 2 as part of the construction to form a housing for the apparatus. The telephone instrument has a housing comprising a first section 51 in the form of a base section and a second section 52 in the form of a top section. The top section 52 is constructed from four sub-sections 53, 54, 55 and 56, sub-sections 54, 55 and 56 being identical to each other and of the form shown in FIGS. 1 and 2. The sub-section 53 is different from the other sub-sections and is designed to locate a handset 57. Depending on the facilities to be provided by the telephone instrument a greater or lesser number of the sub-sections 54, 55 and 56 are provided while only one sub-section 53 per instrument is used. It is, alternatively, possible to dispense with the sub-section 53 and mount the handset 57 on a hook switch projecting from the side of the base section 51 as is shown in FIG. 7.

The sub-sections 54, 55 and 56 carry a selected arrangement of pushbuttons 58, and cover plates 59 and 60 which may be blank or may be provided with legends. A further sub-assembly 61 carrying pushbuttons 62 and a display device 63 is mounted on the sub-sections 54, 55 and 56 by means of barbs 65 which engage with the apertures 64 in the sub-sections.

The rear of the base section 51 is provided with a plurality of cut outs 68 through which cable entry may be effected. The cut outs may have plugs and/or sockets mounted in them or be covered by blanking plates depending on cable entry requirements. Telephone and data circuits and components may be mounted on printed circuit boards located by projections 69.

The sub-sections 54, 55, 56 are attached to the first or base section 1 by means of screws passing through bosses 66 and pillars 67 (FIG. 3) in the base section into threaded inserts (not shown) located in the ridges 26 and 27 of the sub-sections. Various additional or alternative methods of connecting the base and top sections would be readily apparent to those skilled in the art. For example horizontally extending lugs could be formed on the ridge 28 which engage in slots provided in the rear of the base section. Alternatively adhesives could be used, particularly with simple instruments where a replacement rather than repair philosophy was employed.

Thus a telephone instrument range offering a variety of different facilities can be constructed using one or more sub-sections as described with reference to FIGS. 1 and 2. By arranging the pushbuttons to cover the spaces between the apertures of the array and by mounting cover plates in the apertures where no pushbuttons are required a finished, visually attractive, housing can be provided using a minimum number of basic parts.

FIG. 4 shows a plan view of a telephone instrument similar to that shown in FIG. 3. The telephone instrument shown in FIG. 4 comprises a handset 107 mounted in a handset sub-section 103 and three indentical sub-sections 104, 105 and 106 which carry a plurality of pushbuttons 108, a cover plate 110 having spaces 120 for writing addresses for repertory dialling or call transfer and indicator devices 121 for indicating the address operated by a pushbutton depression or of a received call, a blank cover plate 122, and a further sub-assembly 111 carrying further pushbuttons 112 and a display unit 113. The pushbuttons 108 are of the same form as the pushbuttons 23 and the two columns immediately to the left of the cover plate 110 have their tops turned through 180 degrees with respect to each other. This enables the addresses written on the cover plate to be spaced at half the spacing of the pushbuttons which relate to those addresses, the depressions 50 indicating the address associated with a particular pushbutton. A similar arrangement is used in the two columns to the right of the cover plate 110 for the same purpose.

The telephone instrument described with reference to FIG. 4 may be assembled as illustrated in FIG. 3 and uses the sub-section as illustrated in FIGS. 1 and 2.

Figure 5:
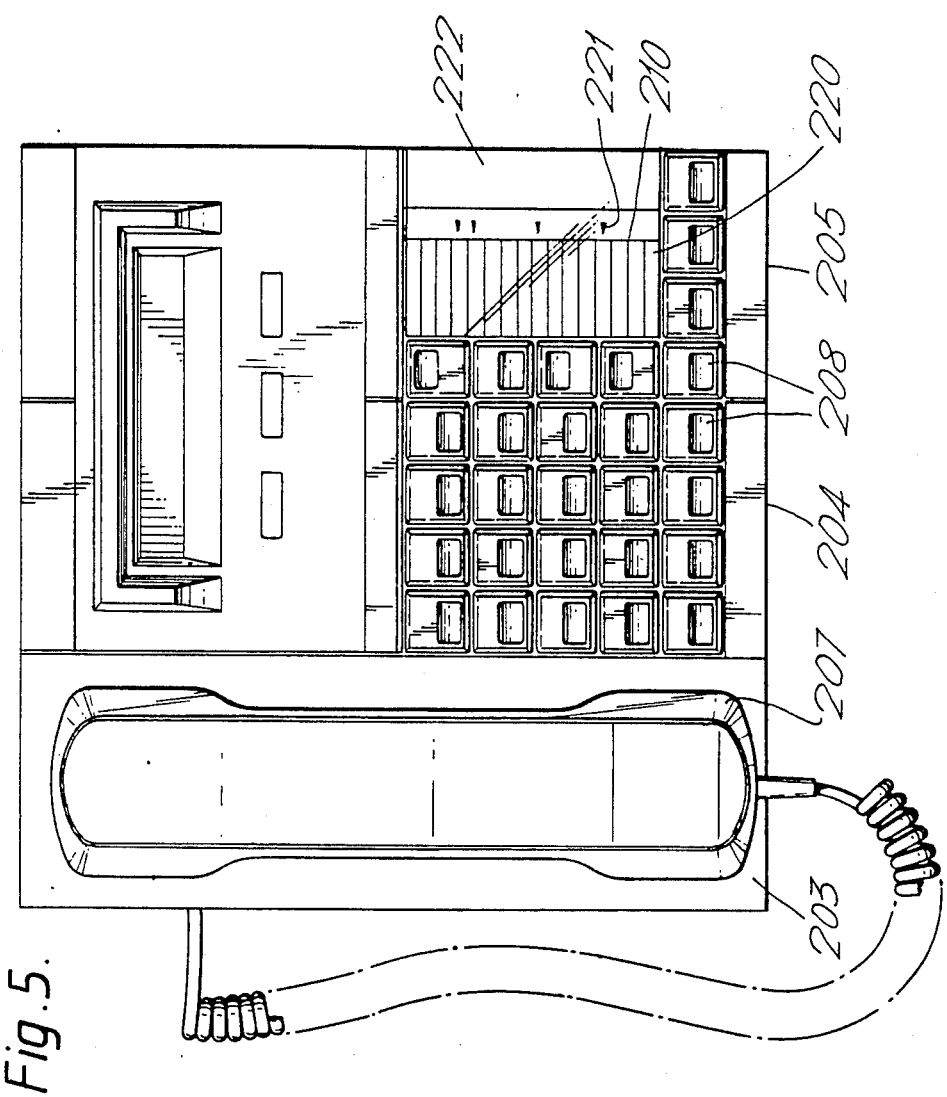
FIG. 5 is a plan view of a further telephone instrument having a housing sub-assembly according to the invention.

FIG. 5 shows a plan view of a telephone instrument having fewer facilities than that shown in FIG. 4. The instrument shown in FIG. 5 comprises a handset section 203 carrying a handset 207 and two identical sub-sections 204 and 205. The first sub-section 4 carries an array of pushbuttons 208 while the second sub-section carries a number of pushbuttons 208, a cover plate 210 which has spaces for addresses 220 and indicators 221 and a plain spacer 222.

The telephone instrument shown in FIG. 5 is constructed from the same sub-sections as that shown in FIG. 4.

Figure 6:
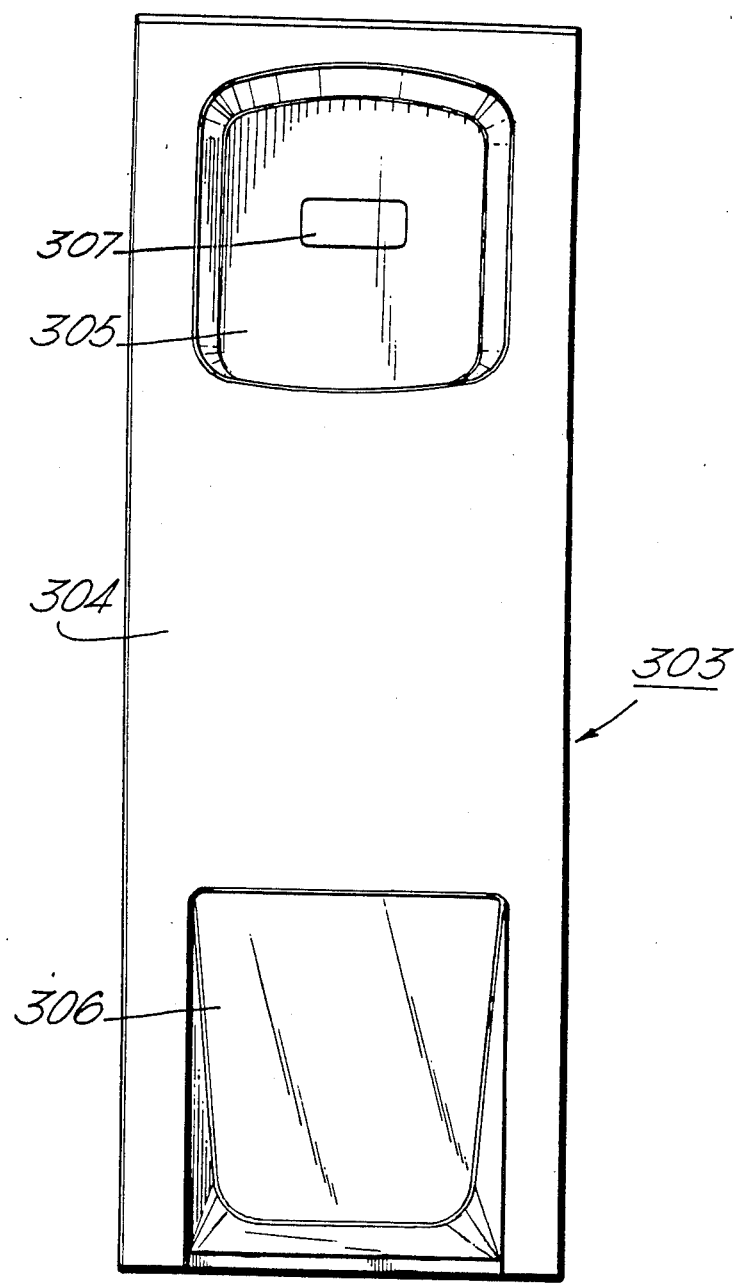
FIG. 6 shows a handset locating sub-assembly of a housing for a telephone instrument as shown in FIGS. 3, 4 and 5.

FIG. 6 shows a plan view of a handset sub-section suitable for use in the telephone instruments shown in FIGS. 3, 4 and 5. The handset sub-section 303 comprises a rectangular plate 304 provided with two recesses 305 and 306. The recesses 305 and 306 are spaced and dimensioned to receive the mouth and ear pieces of the telephone handset. The instruments shown are designed for desk top mounting and the handset is kept in position by gravity. However, if wall mounting was desired with the handset lying substantially vertically rather than horizontally this could be achieved by appropriate design of the shape of the mouth or ear piece and the recesses. The recess 305 is provided with an aperture 307 through which the hook switch projects so that it can be operated by replacing the handset on the sub-section.

FIG. 7 shows a perspective view of a telephone instrument which comprises a top section 701, a bottom section 702, and a hand set 703 which rests on a hook switch 704. The top section 701 comprises a sub-section as shown in FIGS. 1 and 2 and is provided with an array of pushbuttons 705 which cover the second part 31 of the sub-section. The first part 21 of the sub-section is covered by a sub-assembly which comprises a cover plate 706 which carries two pushbuttons 707 and 708 and a display device 709.

If a basic telephone is required then the cover plate 706 will not carry the pushbuttons or display device, but may for example carry a label indicating the telephone number. In addition the array of pushbuttons 705 will comprise ten pushbuttons, the vacant positions of the array of apertures then being covered by cover plates which may be formed by dummy pushbutton heads or may be a single piece plate covering two or more apertures.

Consequently a range of compact telephone instruments offering a range of facilities, such as a display indicating the time or number dialled, plan set signalling, and repertory dialling can be constructed using a sub-section such as that shown in FIGS. 1 and 2 as the top section of the housing to mount the various pushbutton and cover plate combinations required.

Clearly many alternative arrangements using a sub-section as exemplified by that shown in FIGS. 1 and 2 can be constructed, the layout of the cover plates and pushbuttons being variable to give a desired asthetic effect and to provide access to the facilities provided. Thus by using a sub-section provided with a regular array of apertures for locating pushbuttons and by arranging the buttons of adjacent pushbuttons to cover the area between the adjacent apertures a finished appearance can be given to a telephone instrument while allowing many different options to be offered using the same top sub-section. Clearly where single isolated pushbuttons are not required for a particular instrument the cover plate for that location could be constructed to have the same appearance as a pushbutton top.

Electrical apparatus other than telephone instruments can be constructed using a sub-assembly according to the invention wherever a variety of functions may be required to provide a range of apparatus. Examples of such apparatus include personal computers, data terminals, calculators, radios. of apparatus. Examples of such apparatus include personal computers, data terminals, calculators, radios.

I claim:

1. A sub-assembly of a housing for electronic equipment and which is adapted for supporting electronic components thereon, such sub-assembly comprising:
   a molded plastics body having an exterior rectangular surface adapted to form part of the exterior surface of the housing and an interior rectangular surface adapted to form part of the interior surface of the housing such interior surface having projections thereon for engaging a printed circuit board;
   a uniform rectangular array of a plurality of rows of equi-spaced pushbutton apertures in said body extending from the exterior surface to the interior surface thereof, such array extending completely across the width of a first rectangular area of such exterior surface, such first rectangular area extending completely across the width of such exterior surface, the apertures in such array which are adjacent the edges of the width of such first rectangular area being spaced from such edges by half the spacing between such apertures; and
   a plurality of pushbuttons respectively located in said apertures, the pushbuttons in adjacent apertures being shaped and dimensioned so as to cover substantially all of the area of said exterior surface of said body between such adjacent apertures, gaps being left between the pushbuttons in such adjacent apertures just sufficient to permit such pushbuttons to be operated individually
   whereby a first such sub-assembly may be butted against a second such sub-assembly so as to form a unitary sub-assembly of twice the width of either of the first and second sub-assemblies and having a single contiguous uniform rectangular array of equi-spaced pushbutton apertures therein.

2. A sub-assembly as claimed in claim 1, in which one or more of said apertures do not contain pushbuttons, and further comprising coverplates mounted in such apertures in place of pushbuttons.

3. A sub-assembly as claimed in claim 2, in which each coverplate is shaped to appear as the pushbuttons replaced thereby.

4. A sub-assembly as claimed in claim 1, further comprising a printed circuit board mounted on said projections on the interior surface of said body, such printed circuit board having conductive tracks thereon; a plurality of plungers respectively affixed to respective pushbuttons; and a plurality of dome-shaped elastomeric switching elements respectively arranged between the respective pushbutton plungers and the printed circuit board, each of such switching elements having an electrically conductive contact which bridges conductive tracks on the printed ciruit board when the corresponding pushbutton is depressed.

5. A sub-assembly as claimed in claim 4, in which said first rectangular area of said exterior surface of said plastics body has further apertures therein, and further comprising a plurality of indicating devices respectively located in such further apertures.

6. A sub-assembly as claimed in claim 5, in which each of said indicating devices comprises a light source mounted on said printed circuit board and a light guide extending into the corresponding further aperture to conduct light from the light source to the exterior surface of the plastics body.

7. A sub-assembly as claimed in claim 1, in which said plastics body has a single aperture in a second rectangular area of the rectangular exterior surface thereof, such single aperture extending over most of such second rectangular area.

8. A sub-assembly as claimed in claim 7, in which the first and second areas of the exterior rectangular surface of said plastics body are divided by a third rectangular area thereon in the form of a ridge parallel to and extending completely across the width of said rectangular exterior surface.

9. A sub-assembly as claimed in claim 8, in which the exterior rectangular surface of said plastics body further comprises fourth and fifth rectangular areas, each of which is in the form of a ridge which extends parallel to and completely across the width of such rectangular exterior surface, such fourth and fifth rectangular areas being at respective ends of the length of such rectangular exterior surface.

10. A sub-assembly as claimed in claim 9, in which said fourth and fifth retangular areas comprise means for locating said printed circuit board.

11. A sub-assembly as claimed in claim 10, in which said third rectangular area also comprises means for locating said printed circuit board.

12. A sub-assembly as claimed in claim 9, in which said fourth and fifth rectangular areas comprise means for connecting said sub-assembly to a further sub-assembly of said housing.

* * * * *